United States Patent

Kavanaugh et al.

[15] 3,686,443

[45] Aug. 22, 1972

[54] SUPERVISORY SIGNALLING IN PCM TELEPHONE SYSTEM

[72] Inventors: Paul K. Kavanaugh, 528 Countryside Lane, Webster, N.Y. 14580; Michael A. Boehly, 35 Nory Lane, Rochester, N.Y. 14606

[22] Filed: Jan. 4, 1971

[21] Appl. No.: 103,615

[52] U.S. Cl...............................179/15 BY, 325/321

[51] Int. Cl................................................H04j 1/14

[58] Field of Search......179/15 BA, 15 BY; 325/321, 325/322

[56] References Cited

FOREIGN PATENTS OR APPLICATIONS 416,376 4/1966 Japan...................179/15 BA

*Primary Examiner*—Ralph D. Blakeslee

*Attorney*—Hoffman Stone and Charles C. Krawczyk

[57] ABSTRACT

In a T-carrier system of the kind in which supervisory signals are transmitted only in selected frames and not in others, signalling pulses are generated at the receiver during frames in which they are not transmitted, thereby enabling use of a signalling detector designed for operation in systems in which the signalling information is transmitted in every frame.

3 Claims, 1 Drawing Figure

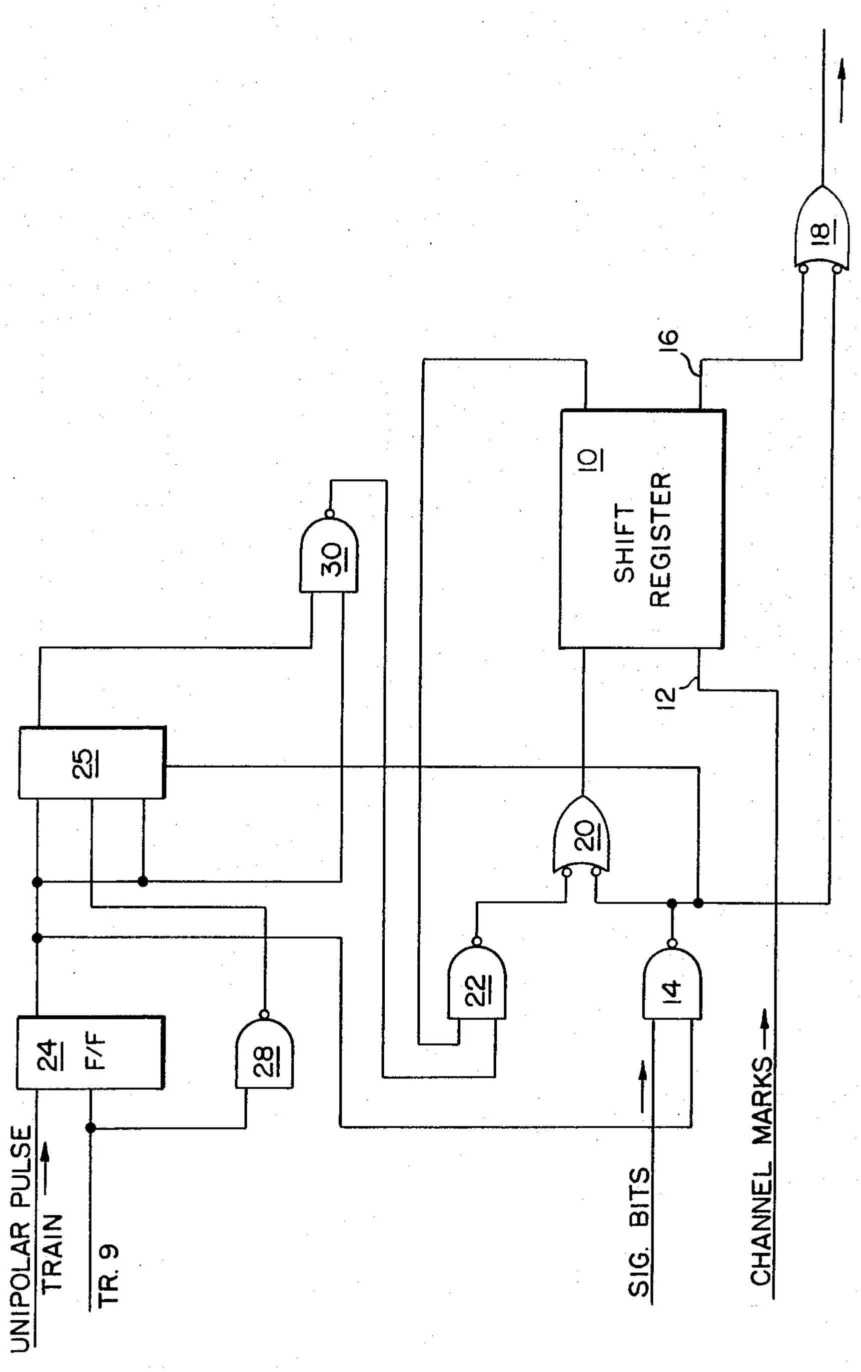
INVENTORS
PAUL K. KAVANAUGH
MICHAEL A. BOEHLY
BY
Hoffman Stone
ATTORNEY

SUPERVISORY SIGNALLING IN PCM TELEPHONE SYSTEM

BRIEF DESCRIPTION:

This invention relates to pulse code modulation systems of the T-carrier type, and, more particularly, to the reception of supervisory signals in systems of this kind in which the supervisory signals are transmitted only in selected frames, such as, for example, every fourth frame, and not in the other frames.

It has been proposed by E. J. Anderson, et al, in U.S. Pat. No. 3,359,373 to modify the sequence of transmitting channel signalling bits in T-carrier systems by forcing like digits in the signalling digit space for each channel in two successive frames of each four to prevent appearance of the framing pattern in the signalling time slots, while, at the same time, allowing transmission of up to four signalling states per channel. The circuit of the invention is primarily an adaptor circuit to facilitate operation in the new system of receivers designed for use in the older T-carrier system in which signalling information is transmitted during every frame. In receivers of this type, an onhook condition is indicated by the presence of a pulse in the signalling bit time slot, and the incoming pulses in those time slots are integrated to provide an onhook indication. In the system described in the patent, signalling bits of this nature are present only in every fourth frame and the energy available for integration to develop an onhook signal at the receiver is often inadequate to maintain the needed output level of the integrator.

Briefly, in accordance with the invention, the signalling bits omitted from the transmitted signal are synthesized at the receiver and applied to the signalling detectors, thereby restoring the energy level at the inputs of the detectors to the same value it would have been had the signalling bits been transmitted in every frame. In the embodiment described, the signals are synthesized by a relatively simple arrangement of a recirculating shift register operated in response to signals available at the receiver applied through a pair of flip-flop counters and a set of gates.

DETAILED DESCRIPTION:

A presently preferred embodiment of the invention will now be described in connection with the accompanying drawing, wherein the single FIGURE is a schematic diagram of a circuit according to a presently preferred embodiment of the invention.

As shown, the circuit includes a 24 stage shift register 10 which is stepped in response to channel marking pulses generated in the receiver and applied at the stepping terminal 12 of the shift register.

All of the signalling bits from the incoming pulse train are applied to one input of an AND gate 14, which is alternately enabled and inhibited during successive frames. During the first frame, for example, which is designated as one in which the signalling bit is present in each channel, the gate 14 is enabled. During the second frame it is inhibited to bar the passage of binary "one" signals that may be present in the signalling time slots. During the third frame, binary zeros are forced in the signalling time slots and the gate 14 may conveniently be enabled without the risk of any signals passing through it. During the fourth frame, it is again inhibited. During the second, third, and fourth frames the signalling pulses are recirculated through the shift register 10 and appear at its output terminal 16 once during each frame. They are fed through an OR gate 18 to the channel distributor (not shown).

During the first frame, when the AND gate 14 is enabled, the incoming signalling bits are fed through it and the OR gate 18 directly to the channel distributor, and also through an OR gate 20 into the shift register 10. Recirculation of the signals in the shift register 10 is through an AND gate 22, which is alternately enabled for three successive frames and inhibited on the fourth, so that on every first frame of each sequence of four, the signalling information in the shift register is updated.

The AND gates 14 and 22 are selectively inhibited and enabled by a pair of flip-flop counters 24 and 25. The first counter 24 changes state at the beginning of each frame in response to the incoming framing signal and the framing pulse denoted TR9 generated in the receiver. The output of the counter 24 alternates from frame to frame, and is applied to enable the first AND gate 14 and to inhibit it alternately during successive frame. The TR9 pulses are also fed through an inverter 28 to one input of the second counter 25 along with the output of the first counter 24. The outputs of the two counters 24 and 25 are applied at separate respective inputs of a recirculation control gate 30, the output of which inhibits the recirculation gate 22 during every fourth frame.

The framing data at the input of the first counter 24 enables the circuit to distinguish between the first and second frame of each group of four successive frames. To distinguish the first pair of frames from the second pair, the output of the gate 14, where pulses appear representing the data in the signalling time slots, is applied to the "clear" input of the second counter 25. Since binary zeros are forced in the signalling time slots in the second pair of frames, the counter 25 is cleared only during the first pair of frames, and positive synchronization is achieved.

The output from the OR gate 18 during the first frame of each group of four consists of the signalling pulses generated directly from the incoming pulse train and fed through the AND gate 14. During the succeeding three frames, the output of the OR gate 18 consists of pulses from the recirculating shift register 10. The channel distributor receives the signalling data during all frames even though the data are transmitted only during every fourth frame.

What is claimed is:

1. A signal synthesizing circuit for use in the receiver of a pulse code modulated signal transmission system of the T-carrier type in which supervisory signals are transmitted only in selected frames and not in others comprising:

a. a shift register connected to advance one step at the beginning of each channel signalling time slot, b. first gate means for applying signalling bits to said shift register, c. recirculating gate means for applying the output signals of said shift register to its input, d. a counter arranged to produce an output signal during and equal in duration to the selected frames, and e. gate means responsive to said counter for selectively enabling and inhibiting said first gate means and said recirculating gate means to apply signalling pulses from the incoming pulse train to said shift register during the selected frames, and to recirculate signals in said shift register during the other frames.

2. A signal synthesizing circuit according to claim 1 wherein the output of said first gate means is applied to said counter to clear it during frames in which binary ones appear in the signalling time slots.

3. A signal synthesizing circuit for use in the receiver of a pulse code modulated signal transmission system of the T-carrier type in which supervisory signals are transmitted only in selected frames and not in others comprising:

a. a shift register connected to advance one step at the beginning of each channel signalling time slot, b. first gate means for applying signalling bits to said shift register, c. recirculating gate means for applying the output signals of said shift register to its input, d. a counter arranged to produce an output signal during and equal in duration to the selected frames, e. gate means responsive to said counter for selectively enabling and inhibiting said first gate means and said recirculating gate means to apply signalling pulses from the incoming pulse train to said shift register during the selected frames, and to recirculate signals in said shift register during the other frames, and f. an OR gate for applying the outputs of said shift register and of said first gate means to the channel distributor of the receiver.

* * * * *